(12) United States Patent
Bovée

(10) Patent No.: US 10,973,174 B2
(45) Date of Patent: Apr. 13, 2021

(54) SYSTEM AND METHOD FOR SOWING SEEDS

(71) Applicant: RIJK ZWAAN ZAADTEELT EN ZAADHANDEL B.V., De Lier (NL)

(72) Inventor: Adrianus Johannes Cornelis Bovée, De Lier (NL)

(73) Assignee: RIJK ZWAAN ZAADTEELT EN ZAADHANDEL B.V.

( * ) Notice: Subject to any disclaimer, the term of this patent is extended or adjusted under 35 U.S.C. 154(b) by 680 days.

(21) Appl. No.: 15/566,378

(22) PCT Filed: Apr. 14, 2016

(86) PCT No.: PCT/NL2016/050265
§ 371 (c)(1),
(2) Date: Oct. 13, 2017

(87) PCT Pub. No.: WO2016/167659
PCT Pub. Date: Oct. 20, 2016

(65) Prior Publication Data
US 2018/0110187 A1    Apr. 26, 2018

(30) Foreign Application Priority Data
Apr. 14, 2015    (NL) .................................... 2014637

(51) Int. Cl.
*A01G 9/00*          (2018.01)
*A01C 21/00*         (2006.01)
(Continued)

(52) U.S. Cl.
CPC .................. *A01G 9/00* (2013.01); *A01C 7/04* (2013.01); *A01C 14/00* (2013.01); *A01C 21/005* (2013.01);
(Continued)

(58) Field of Classification Search
CPC .. A01G 9/00; A01G 1/001; A01C 7/04; A01C 21/00; A01C 21/005; B07C 5/02;
(Continued)

(56) References Cited

U.S. PATENT DOCUMENTS 3,738,530 A * 6/1973 Fine ........................ A01C 7/042
                                                      221/211
4,401,236 A * 8/1983 Germaine .............. B65G 47/91
                                                      221/211
(Continued)

FOREIGN PATENT DOCUMENTS

WO    2008/150903 A1    12/2008

OTHER PUBLICATIONS

International Search Report with Written Opinion corresponding to International Patent Application No. PCT/NL2016/050265, dated Sep. 28, 2016.

*Primary Examiner* — Ebony E Evans
(74) *Attorney, Agent, or Firm* — Dechert LLP; Andrew T. Wilkins; Robin L. Brese

(57) ABSTRACT

The present invention relates to a device and method for sowing seeds. The invention relates more particularly to a device and method for sowing seeds as part of a plant breeding process. The system according to the invention comprises a separating device for separating a single seed relative to a remainder of the plurality of seeds, an optical recognition system for recognizing the separated seed, a robot arm device for picking up the separated seed and for sowing the picked-up seed, and a control unit for controlling the separating device, the optical recognition system and the robot arm device. With this system it is possible to sow seeds in a more accurate and less error-prone manner.

22 Claims, 9 Drawing Sheets

(51) Int. Cl.
  *A01C 7/04*   (2006.01)
  *G06K 9/00*   (2006.01)
  *A01C 14/00*  (2006.01)
  *A01G 9/08*   (2006.01)
  *A01G 22/00*  (2018.01)
  *B07C 5/02*   (2006.01)
  *B07C 5/342*  (2006.01)
  *B07C 5/36*   (2006.01)
  *B25J 9/16*   (2006.01)

(52) U.S. Cl.
  CPC ............ *A01G 9/085* (2013.01); *A01G 22/00* (2018.02); *B07C 5/02* (2013.01); *B07C 5/3422* (2013.01); *B07C 5/3425* (2013.01); *B07C 5/36* (2013.01); *B07C 5/365* (2013.01); *G06K 9/00664* (2013.01); *B25J 9/1679* (2013.01); *B25J 9/1697* (2013.01)

(58) Field of Classification Search
  CPC .......... B07C 5/365; B07C 5/3422; B25J 9/16; G06K 9/48
  USPC ....... 47/31.1, 58.1 SE, 900, 1.01 P; 382/103, 382/110, 153, 154, 155, 159, 161, 174, 382/181, 182, 183, 190, 195, 199, 203, 382/206, 286, 291, 321, 178
  See application file for complete search history.

(56) References Cited

U.S. PATENT DOCUMENTS

| | | | | |
|---|---|---|---|---|
| 5,031,358 A * | 7/1991 | Sussman | ................ | A01G 9/246 47/58.1 R |
| 5,044,518 A | 9/1991 | Sakaue et al. | | |
| 5,255,618 A * | 10/1993 | Berry | .................... | A01C 7/042 111/200 |
| 6,150,158 A * | 11/2000 | Bhide | .................... | A01H 4/001 221/211 |
| 6,688,037 B2 * | 2/2004 | Keller | .................... | A01C 7/042 414/737 |
| 7,051,475 B1 * | 5/2006 | Sena | .................... | A01C 11/025 111/105 |
| 7,111,740 B2 * | 9/2006 | Ogawa | ..................... | B07C 5/10 198/445 |
| 7,530,197 B2 * | 5/2009 | Timmis | ................... | A01H 1/04 47/57.6 |
| 7,600,642 B2 * | 10/2009 | Deppermann | ......... | B07C 5/36 209/552 |
| 7,685,768 B2 * | 3/2010 | Deppermann | ......... | A01C 1/025 47/58.1 SE |
| 7,934,600 B2 * | 5/2011 | Deppermann | ........... | A01C 1/00 209/512 |
| 7,998,669 B2 * | 8/2011 | Deppermann | ........... | G01N 1/04 435/6.1 |
| 8,028,469 B2 * | 10/2011 | Deppermann | ........... | A01C 1/00 47/14 |
| 8,189,901 B2 * | 5/2012 | Modiano | .................. | B07C 5/34 250/339.07 |
| 8,363,905 B2 * | 1/2013 | Owens, Jr. | ............... | G06K 9/00 382/110 |
| 8,437,874 B2 * | 5/2013 | Lafferty | .................... | A01G 7/00 700/214 |
| 8,613,158 B2 * | 12/2013 | Conrad | ..................... | G06T 7/60 47/58.1 SE |
| 8,833,565 B2 * | 9/2014 | Becker | ..................... | A01C 1/00 209/552 |
| 2006/0236604 A1 * | 10/2006 | Hesse | ..................... | A01C 1/06 47/57.6 |
| 2008/0000815 A1 * | 1/2008 | Deppermann | ......... | B07C 5/3425 209/552 |
| 2008/0317279 A1 * | 12/2008 | Deppermann | ...... | G01N 15/1463 382/100 |
| 2009/0126266 A1 * | 5/2009 | Mulder | .................... | A01C 7/04 47/58.1 SE |
| 2009/0155878 A1 * | 6/2009 | Becker | ................... | G01N 1/286 435/173.9 |
| 2009/0241414 A1 * | 10/2009 | Van Adrichem | ....... | A01G 29/00 47/57.5 |
| 2010/0044356 A1 * | 2/2010 | Cope | ........................ | G01N 1/04 219/121.67 |
| 2012/0020531 A1 | 1/2012 | Owens, Jr. | | |
| 2013/0294656 A1 * | 11/2013 | Conrad | .................... | A01G 7/00 382/110 |
| 2015/0319914 A1 * | 11/2015 | McCarty, II | ........... | G01N 1/286 47/58.1 SE |

* cited by examiner

SYSTEM AND METHOD FOR SOWING SEEDS

RELATED APPLICATIONS

This application is a 35 U.S.C. § 371 filing of International Patent Application No. PCT/NL2016/050265, filed Apr. 14, 2016, which claims priority to Netherlands Patent Application No. 2014637, filed Apr. 14, 2015. Each of the aforementioned applications is incorporated herein by reference in its entirety.

The present invention relates to a system and method for sowing seeds. The invention relates more particularly to a system and method for sowing seeds as part of a plant breeding process.

In breeding of plants efforts are made to obtain a plant variety having one or more desired properties. One or more plant varieties can be crossed for this purpose, and suitable candidates can be searched for among the thus obtained progeny. These candidates can then be subjected to further crossing and selection steps.

Due to the emergence of DNA techniques it can already be determined at an early stage whether a plant has a desired property. The young plant can for instance be sampled, wherein a small part of the plant is removed for DNA analysis. If this analysis indicates that, based on the obtained genetic information, the plant has the desired property, this plant can already be selected for further steps at an early stage. This in contrast to previous approaches, wherein a plant first had to have grown considerably before it was possible to determine, usually optically, whether the plant had the desired properties. With these techniques it was thus necessary to reserve a large surface area on which the plants could grow. By means of DNA techniques it is possible to select plants at a stage at which they are still relatively small, and thus take up little surface area. Only the selected plants need to continue growing here. In contrast to the previous approaches, the interesting plants are thus the only ones which continue to grow. A considerable space saving is hereby achieved.

The use of the DNA techniques also enables the selection steps to be performed more quickly. Where it was still necessary in previous approaches to await the moment at which a more or less fully grown plant may or may not have displayed a desired property, it is now possible to determine this by means of DNA analysis at the moment that the plant is still a seedling. Previous or subsequent growth stages of the plant can nevertheless be used, since the genetic information does not change, or hardly so.

In the future, breeding techniques will thus for the most part no longer be limited in respect of the amount of soil available to a breeder, but more likely by the quantity of seeds and young plants which can be processed and analysed.

An important step during the breeding process is the sowing of possibly interesting seeds. These seeds can for instance come from progeny, possibly from crossed parent lines. The current DNA techniques make it possible to work with a much greater diversity of seeds. It must be possible to accurately monitor the seeds during the breeding process.

The quantity of seeds per type is however usually so small that use cannot be made of standard sowing machines. These machines are configured to sow seeds on a large scale. An example of such a sowing machine comprises a cylinder provided on its periphery with vacuum holes. Rotating this cylinder in the vicinity of a bin with a large quantity of seeds therein achieves that the seeds are sucked against the cylinder at the position of the vacuum holes by the vacuum and are then released at a different location, whereby the seeds will fall at given sowing positions. Use is usually made here of trays comprising a plurality of sowing positions, for instance because a plurality of recesses or cavities has been made in a growth substrate. The sowing positions are placed at a regular mutual distance here.

The above stated machine is not suitable for sowing a select group of seeds, for instance 10 to 100 seeds. This number of seeds is not sufficient to be able to sow effectively, since the seeds would only be able to cover a very small part of the cylinder. The majority of the vacuum holes will after all remain uncovered. Contrary to when a large number of seeds >10000 is present, it can further not be ensured that the seeds are actually sown. With large numbers, there will always be seeds which are positioned well relative to the vacuum holes. This is certainly not the case with small quantities.

According to the prior art, seeds are therefore sown manually during a breeding process. This process is time-consuming. It is also necessary to track which seed has been sown at which position. Because the quantities of different seeds will increase in the future due to the use of DNA analysis, this process will become increasingly error-prone.

It is therefore an object of the present invention to provide a solution wherein seeds can be sown in a less labour-intensive and less error-prone manner.

This object is achieved with the system for sowing seeds as defined in claim 1. According to the invention, this system comprises a separating device for separating a single seed relative to a remainder of the plurality of seeds, an optical recognition system for recognizing the separated seed, a robot arm device for picking up the separated seed and for sowing the picked-up seed, and a control unit for controlling the separating device, the optical recognition system and the robot arm device.

According to the invention, a single seed is separated from a remainder of the plurality of seeds. This makes it possible to pick up and sow the separated seed automatically. Whether a seed has been separated is recognized by an optical recognition system.

All seeds of said plurality of seeds preferably have the same taxonomy. More particularly, all seeds of said plurality belong to the same plant family, genus, species, subspecies or variety. The seeds of said plurality can also belong to the progeny of a determined crossing or groups of crossings, or belong to plants of the same population. The seeds of said plurality of seeds can for instance though not exclusively belong to one of the following genera: *Apium, Arabidopsis, Beta, Brassica, Capsicum, Cichorium, Citrillus, Cucumis, Cucurbita, Daucus, Diplotaxis, Eruca, Glycine, Hordeum, Lactuca, Oryza, Raphanus, Solanum, Spinacia, Triticum,* and *Zea*.

The system can comprise a memory which is configured to store a seed profile, wherein the seed profile describes characteristics regarding the dimensions and/or shape of the seed for separating. The seed profile can for instance comprise a file made by a user which is loaded into the system. The control unit can be embodied here as a computer or an embedded system which can analyse the loaded data and can control the other components in the system on the basis of the read data.

A seed profile can comprise a geometrical description of a seed. A seed can for instance have an elliptical contour when lying on a flat plate in a determined position. It is possible that a seed can lie in multiple positions, in which it can also have different contours. In such a case the seed profile can comprise characteristic dimensions and/or shapes per position. Examples of characteristic dimensions are length, width, circumference.

By means of the seed profile the optical recognition system can recognize whether a seed is in a suitable position and at a suitable location for being picked up. It is also possible for a seed to be recognized as a single seed, but for the position in which the seed lies to be deemed unsuitable for being picked up in reliable manner, for instance because the seed lies too closely against another seed.

The optical recognition system can be provided with a camera for recording an image of the plurality of seeds and an image analysis unit for analysing the recorded image. The image analysis unit can be configured to identify the separated seed on the basis of the seed profile. The optical recognition system can further comprise an output unit for output of position information about the identified seed to the robot arm device, optionally via the control unit.

The image analysis unit can for instance be configured to detect a contour in the recorded image and to assign the contour to a seed if dimensions and/or shape of the detected contour correspond to the seed profile. The system can then be configured only to pick up the detected seed if the distance between the detected contour and an adjacent contour is more than a predetermined distance. The adjacent contour can here be another individual seed which may or may not be in a suitable position for being picked up. The adjacent contour can however also relate to a cluster of seeds.

In order to pick up a seed in reliable manner the robot arm device requires a determined distance to an adjacent seed. Determining whether this is the case takes place on the basis of the detected contours and can take place within the image analysis unit or control unit.

The control unit can be configured to control the separating device to once again separate the seeds if the optical recognition system has detected at least one contour, but wherein no seed has been recognized on the basis of the seed profile. An example of such a situation is that 10 of the 30 seeds have been separated after a first separating process of the separating device, and the other 20 seeds are still clustered. The robot arm device will first pick up and sow the 10 separated seeds, optionally in a predetermined pattern. The optical recognition system will then recognize a contour, i.e. that of the remaining cluster. This cluster will however not be recognized as being a seed. The control unit can in such a case control the separating device once again in order to separate the remaining cluster of seeds.

The separating device comprises for instance a vibrating plate. Such a plate can be connected to a plurality of individually movable motors, whereby the plate acquires multiple degrees of freedom of movement. This also makes it possible to influence the position of the seeds on the vibrating plate. If sufficient seeds have been sown, a remainder of seeds can thus be thrown off in a determined direction of the vibrating plate and into a waste container by means of a suitable movement of the vibrating plate.

The robot arm device can comprise a robot arm which is provided at an end with a suction nozzle. With this suction nozzle a seed can be sucked against the suction nozzle by means of a suitable underpressure. The suction nozzle comprises for this purpose a body with a small opening through which the seed cannot be sucked. It is also possible to connect the small opening to a compressed air system, making it possible to switch between a suction force for picking up a seed and a pushing force for sowing the seed.

The sowing can also be achieved by venting the small opening, without making use of compressed air here.

A movable pin can also be received in the duct of the suction nozzle for the purpose of unblocking the small opening in the case that a seed is stuck in the small opening.

In another or a further embodiment the system is configured to compare a recorded image of after and before the robot arm device picks up the separated seed, wherein the control unit is configured to control the robot arm device once again to pick up the separated seed if there is insufficient difference between the compared images. If it is determined that a seed has not been picked up, a depth setting corresponding to the distance of the suction nozzle to a base on which the separated seed lies can be adjusted for said repeated picking up of the separated seed.

With this technique it is also possible to determine whether a seed has become stuck. This is because it is then no longer possible to pick up a further seed. The images of before and after a subsequent seed has been picked up will hereby be almost the same. This means that it is possible to determine by means of the image analysis unit that no seed is being picked up. If the repeated controlling of the robot arm device does not provide a solution an error message can be generated, allowing a user to inspect the suction nozzle. It is however also possible that the pin is first activated to clean the suction nozzle.

There are also other options to check whether a seed has indeed been sown. It is for instance possible to determine this at the sowing position with an optical system. Use can be made for this purpose of the above stated or a further optical recognition system. The pressure in the above stated duct can also be measured. The release of the seed will after all cause a pressure increase.

If it is determined that a seed has become stuck, the robot arm device can control the pin present in the duct to clean the small opening. The system will then once again attempt to place a seed in the missed sowing position.

The system can further be provided with a supply device for supplying the seeds in a container. Examples of suitable containers are for instance tubes, dishes and the like. It is further possible that use is made of a container in which a plurality of compartments are provided for containing seeds with different taxonomies. An example hereof is a cartridge in which a plurality of tubes can be placed, wherein one tube each time corresponds to one taxonomy.

The control unit can be configured to control the robot arm device to engage the container and to carry the seeds out of the container and to the separating device. The robot arm device can for instance grasp a tube with seeds and rotate this above the vibrating plate, such that the seeds fall from the tube onto the vibrating plate. The robot arm device can comprise for this purpose a first device for picking up the separated seed and a second device for engaging the container. The first device can comprise here the above stated suction nozzle and the second device a gripper or other suction nozzle.

The memory can be configured to store a sowing program comprising a correlation between information regarding the taxonomy of the seeds and a sowing pattern for said sowing. Different plants may require different sowing patterns because different plants need different minimal mutual distances in order to grow properly. A sowing pattern can indicate here that seeds can be sown at any available sowing position, for instance in the case of relatively small plants, or that determined sowing positions have to be skipped in order to achieve a determined mutual distance. A sowing position can also be indicated explicitly per seed in the sowing program. The sowing program can for instance indicate that 30 seeds have to be placed in sowing positions 1-30. It is possible here that the system already comprises information regarding which x-y positions are necessary for controlling the robot arm device to sow the seeds at the relevant sowing positions.

It is possible that the sowing program further comprises the number of seeds to be sown per taxonomy and wherein, if this number has been sown and seeds still remain, the control unit is configured to control the separating device to discharge the remaining seeds. If the sowing program for instance indicates that 30 seeds have to be sown and there are 40 seeds on the separating device, 10 seeds will be discharged after 30 seeds have been sown.

The control unit can further be configured to track the sowing positions at which a seed with a determined taxonomy has been sown and/or the sowing program can comprise information about the sowing positions at which a seed with a determined taxonomy has to be sown. In the first case the control unit can be configured for output of information, comprising a correlation between the taxonomy of a seed and the sowing position at which this seed has been sown. This information can then be added to the sowing program, whereby the modified sowing program can be used at a later time.

In an embodiment the seeds are sown on a growth substrate with a plurality of sowing positions, such as a tray, wherein the growth substrate is preferably provided with an identifier. A tray can be manufactured here from a plurality of plastic compartments which are mutually connected and have a substantially constant mutual distance. A suitable growth medium can be provided in each compartment. It is also possible to place such a medium in each compartment after sowing. The growth substrate can further also consist wholly of the growth medium, wherein the sowing positions are formed by means of recesses in the growth medium.

The system can further comprise a substrate moving unit for moving the growth substrate in stepwise manner, wherein the growth substrate comprises a row of sowing positions transversely of a direction of movement of the growth substrate and wherein the control unit is configured to control the robot arm device to sow one seed at a time in one sowing position of a row and, when the sowing in the row has been completed, to control the substrate moving unit to bring a subsequent row of sowing positions into position. It is possible here that only seeds having the same taxonomy are allowed in a row.

The system can further comprise a plurality of falling tubes which are disposed such that each lower opening of each falling tube can be aligned during operation with a respective sowing position associated with the same row. In an embodiment the growth substrate comprises 30 rows of sowing positions, wherein each row comprises 10 sowing positions. In this case system 10 can comprise falling tubes wherein the lower openings, from which seeds fall, are aligned with the 10 sowing positions in a row. The robot arm device will now place one seed at a time in one falling tube, whereby the placed seed will fall into a corresponding sowing position. In this embodiment the robot arm device will place 10 seeds in this manner. The growth substrate will then shift one row.

The system can comprise an identifier application unit for arranging the identifier on the growth substrate. This identifier enables a coupling to the sowing program used for sowing seeds in the growth substrate. The system is preferably configured such that the taxonomy of the seeds which have been sown in the growth substrate can be determined in simple manner using the sowing program and the identifier of the growth substrate. The growth substrate can comprise a storage medium, wherein the control unit is configured to store information regarding the sowing positions at which a seed with a determined taxonomy has been sown in the storage medium.

The sowing program can comprise the above stated correlation for seeds with differing taxonomy. This makes it possible to sow multiple types of seed with a single sowing program. The supply device can for instance be configured to supply a plurality of containers, wherein at least two containers comprise seeds with differing taxonomy. Each container itself preferably only comprises seeds with the same taxonomy. Within the context of the present invention it is however not precluded that the optical recognition system is able to recognize seeds with differing taxonomy on the basis of respective seed profiles. It is hereby no longer strictly necessary to sow in order of taxonomy.

The system can also comprise a device for supplying to the sown seeds one or more substances chosen from the group consisting of water, germination-promoting agents, growth-promoting agents and pesticides. Such a device is preferably disposed downstream of the sowing. It is possible here for the sowing program to comprise substance information per seed or per taxonomy regarding which of said substances must be supplied. The control unit can be configured here to control the device for supplying these substances subject to the substance information.

According to a second aspect, the invention provides a method for sowing seeds which comprises the steps of separating a single seed relative to a remainder of the plurality of seeds using a separating device, optically recognizing the separated seed with an optical recognition system, picking up the separated seed with a robot arm device and sowing the picked-up seed with the robot arm device.

The present invention will be discussed in more detail hereinbelow with reference to the accompanying figures, in which.

Figure 5:
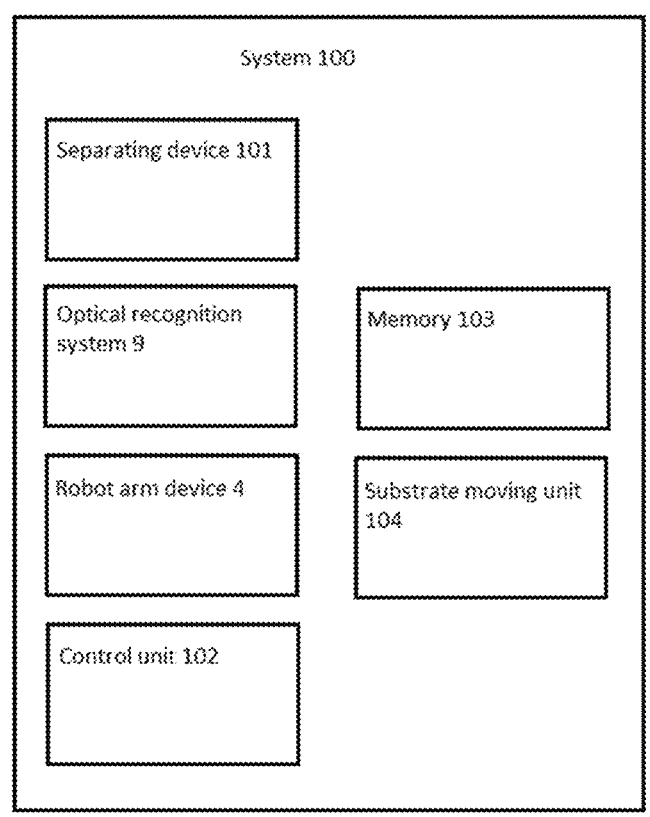
Figure 6:
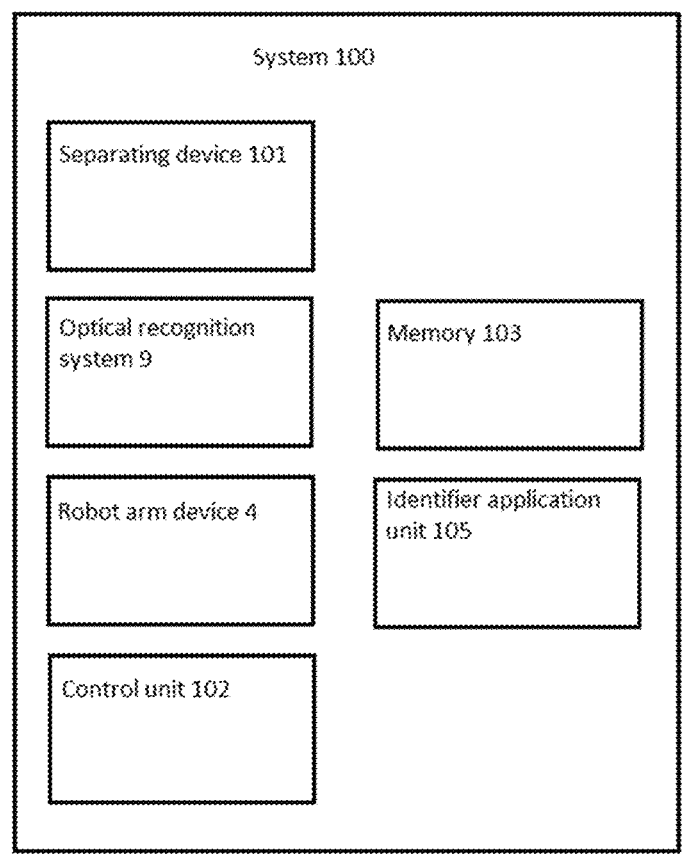
Figure 7:
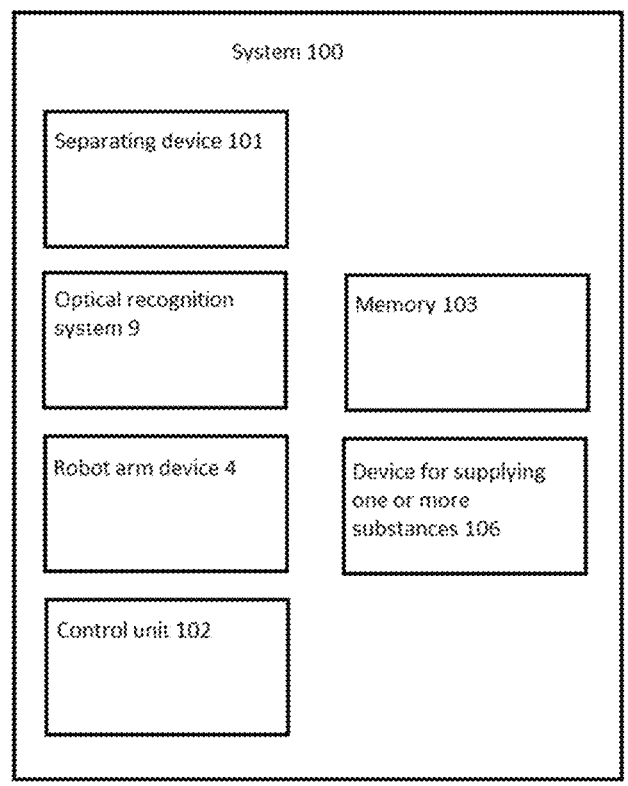
Figure 8:
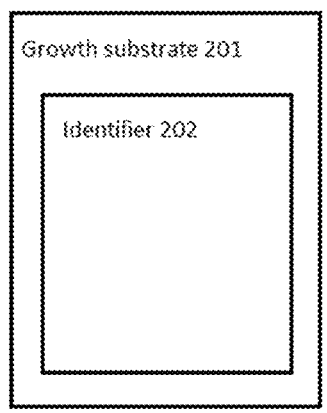
Figure 9:
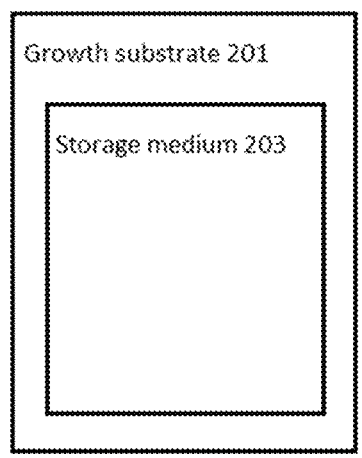

FIG. 5 shows a schematic overview of an embodiment of the present invention comprising a system 100, a separating device 101, an optical recognition system 9, a robot arm device 4, a control unit 102, a memory 103, and a growth substrate moving unit 104;

FIG. 6 shows a schematic overview of an embodiment of the present invention comprising a system 100, a separating device 101, an optical recognition system 9, a robot arm device 4, a control unit 102, a memory 103, and an identifier application unit 105;

FIG. 7 shows a schematic overview of an embodiment of the present invention comprising a system 100, a separating device 101, an optical recognition system 9, a robot arm device 4, a control unit 102, a memory 103, and a device for supplying one or more substances 106;

FIG. 8 shows a schematic overview of an embodiment of the present invention comprising a growth substrate 201 and an identifier 202; and FIG. 9 shows a schematic overview of an embodiment of the present invention comprising a growth substrate 201 and a storage medium 203.

Figure 1:
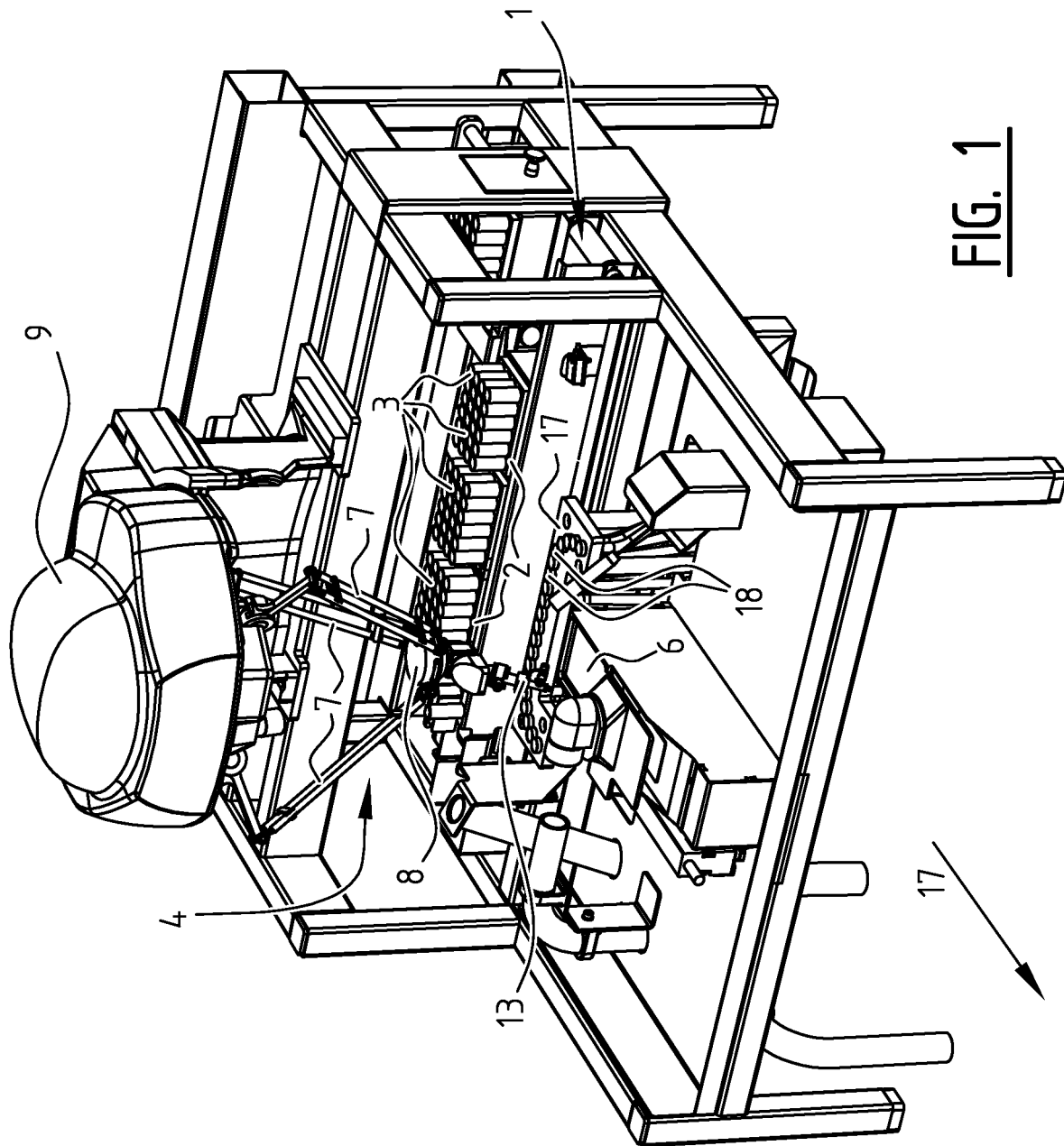
FIGS. 1 and 2 show a schematic overview of an embodiment of the present invention.
Figure 2:
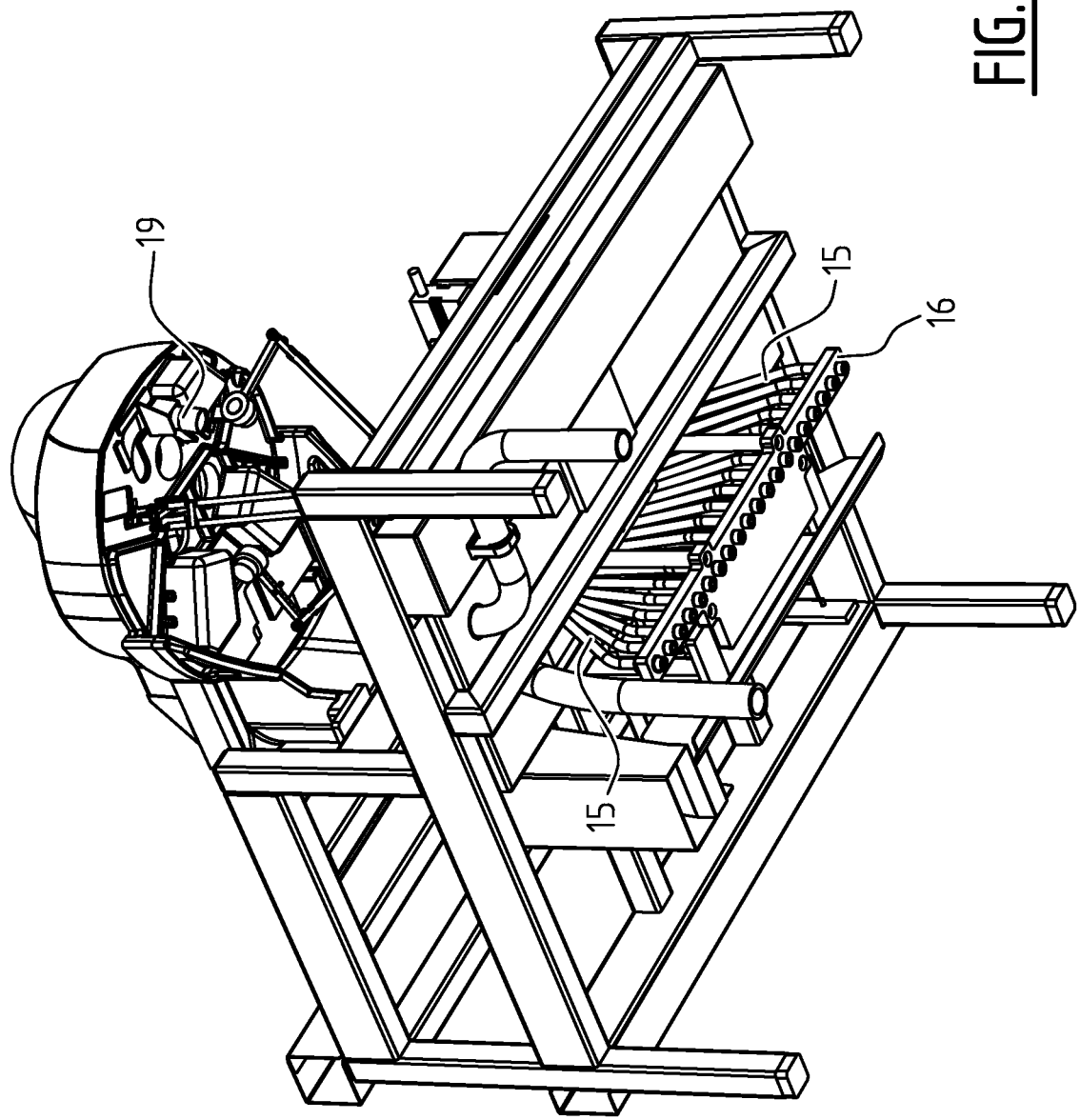

FIGS. 1 and 2 show a schematic overview of an embodiment of the present invention. This comprises a supply device 1 which can transport a plurality of cartridges 2. A plurality of tubes 3 with seeds can be placed in each cartridge 2. It is assumed in the following that seeds with the same taxonomy, for instance cucumber or tomato, are present in each tube 3.

Figure 3:
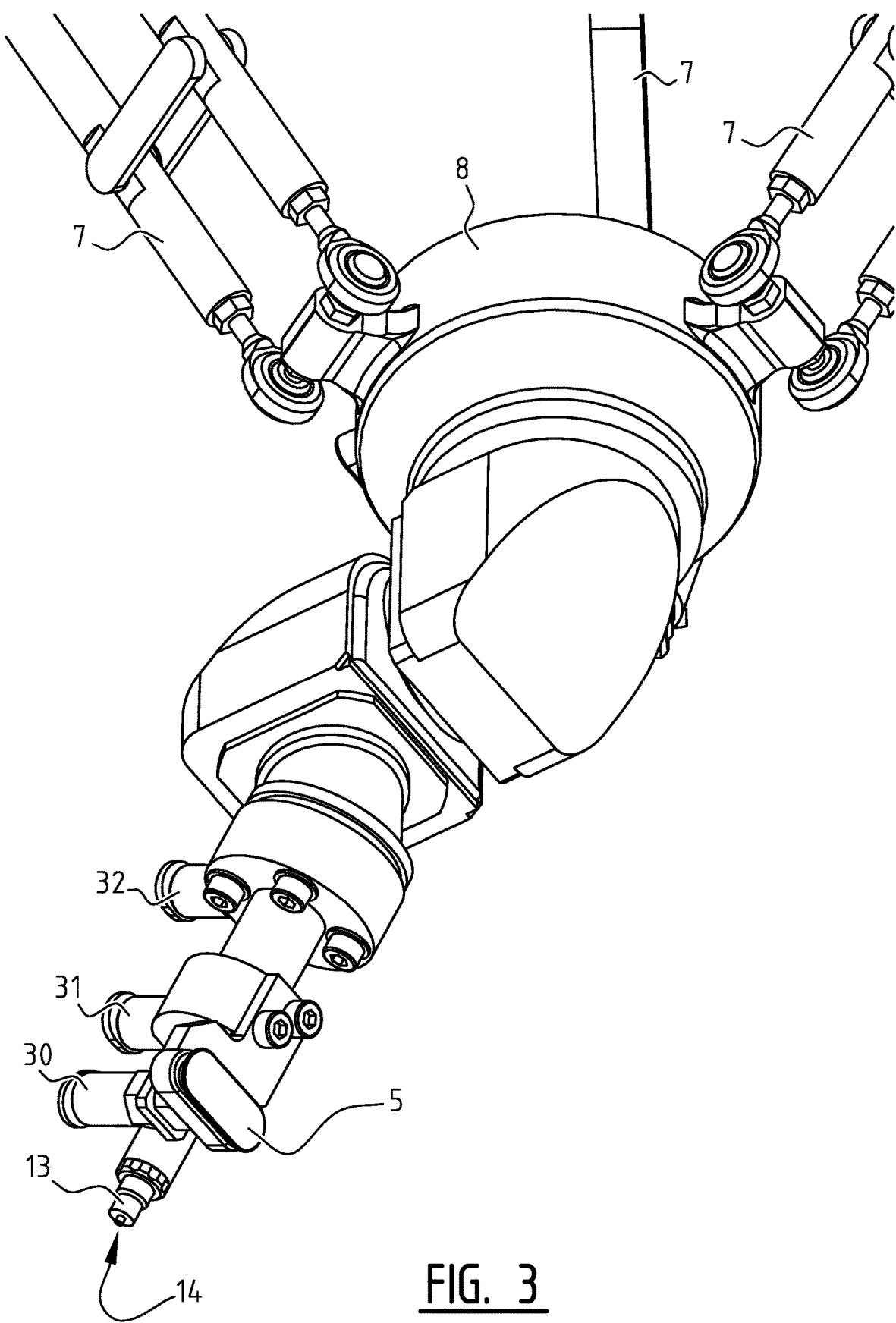
FIG. 3 is a detail view of the coupling part of the robot arm device shown in FIG. 1.

Supply device 1 displaces cartridges 2 to a position in which robot arm device 4 is able to engage tubes 3. Robot arm device 4 is provided for this purpose with a second gripping member 5, which is shown in more detail in FIG. 3. This member is used to take a tube 3 out of a cartridge 2 and to empty the content of tube 3, i.e. the seeds, onto a vibrating plate 6. Only seeds with the same taxonomy are preferably present on vibrating plate 6 during operation.

Gripping member 5 comprises a rubber or other type of resilient element with therein one or more holes which are connected to conduit 30. Conduit 30 is connected here to a vacuum pump for generating suction force which is necessary for picking up a tube 3.

Robot arm device 4 comprises a plurality of individually movable arms 7 which are pivotally connected to a coupling part 8. Second gripping member 5 can be connected here to coupling part 8.

The system of FIG. 1 further comprises an optical recognition system 9 comprising one or more optical cameras 19, see FIG. 2. This is or these are disposed to record an image of vibrating plate 6 and the seeds which may be present thereon.

Before the sowing process begins, the user has loaded a sowing program into a memory (not shown) of the system. Use will be made hereinbelow of a sowing program which is related to the sowing of two species of seeds, i.e. seeds with differing taxonomy. The sowing program comprises in this example the number of seeds to be sown per species, the sowing pattern and a seed profile.

A sowing pattern indicates at which of the sowing positions a seed has to be sown. This can comprise an absolute position indication which can be processed by robot arm device 4. In this example the sowing pattern however comprises information about the minimal mutual distance to be employed here. This mutual distance is related to the manner of growth of the seed or the plant originating therefrom. Some plants already need a lot of space at an early stage. The sowing pattern can thus comprise the information that seeds need not be sown directly adjacently of each other, but that one or more empty sowing positions need always be present therebetween.

A seed profile relates to the shape and/or dimensions of a seed. Some seeds are round and flat, while others are more egg-shaped. The seed profile comprises information with which the optical recognition system can decide whether a seed lies sufficiently isolated relative to other seeds and whether the detected seed corresponds to the seed to be sown.

Figure 4:
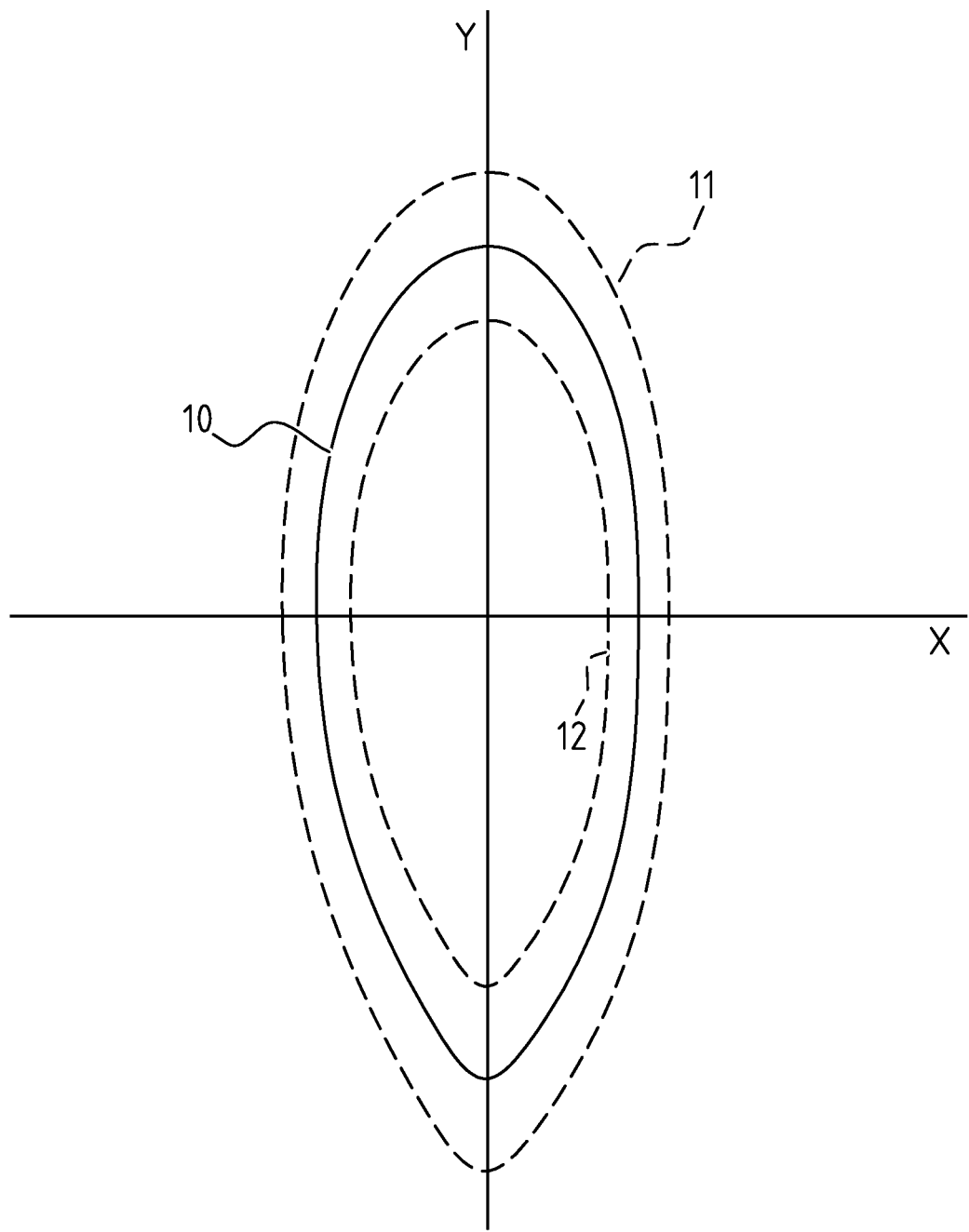
FIG. 4 gives an example of a seed profile.

FIG. 4 shows an example of a seed profile. In this example the seed profile states that the seed to be detected must have an elliptical profile, wherein a detected contour 10 of the seed must lie between a maximal contour 11 and a minimal contour 12, which are stated in the seed profile. This example is based on the situation in which the detected contour of a seed is more or less identical, irrespective of its position. A seed can however have a shape such that the seed can lie on vibrating plate 6 in stable manner in several ways. The seed profile can comprise maximal and minimal contours and/or dimensions per stable position. In this case a seed can thus not only be recognized as such, but the position in which the seed lies on vibrating plate 6 can also be determined. This information can then be used to control robot arm device 4 optimally.

The system comprises a control unit (not shown) for controlling the different components of the system. This unit can for instance control supply device 1 to bring one cartridge 2 into position for robot arm device 4. This latter can then be controlled to take a tube 3 out of cartridge 2 on the basis of the sowing program. Tubes 3 usually comprise an identifier, such as a barcode, which identifies the content of the tube. Robot arm device 4 can now take a tube 3 out of a cartridge 2 and have the identifier of this tube be read by a scanning unit configured for this purpose. This unit preferably forms part of optical recognition system 9. After scanning the identifier the system knows which seeds are in the picked-up tube. These data are compared to the sowing program. If the sowing program indicates that the seeds in question have to be sown, robot arm device 4 will empty the content of the tube onto vibrating plate 6. It is otherwise not precluded that a determined order must be employed during sowing. It is thus possible that robot arm device 4 places the tube back and begins a search for the tube with the seeds which have to be sown first.

After the content of tube 3 has been emptied onto vibrating plate 6, vibrating plate 6 will begin to vibrate in order to separate the seeds from each other. This is a necessary step because seeds will generally lie on or directly adjacently of each other after emptying of the tube. On the one hand this makes it impossible or very difficult to check the taxonomy of the seed, on the other hand it is impossible or very difficult to pick up the seeds from vibrating plate 6 individually using robot arm device 4.

Vibrating plate 6 can be embodied as a plate which is connected to three or more actuators, which can each move or rotate the plate in a different direction. Such vibrating plates are known from the prior art. By combining movements of the actuators the seeds on the vibrating plate can be manipulated in targeted manner.

After vibrating plate 6 has vibrated for a short time, this movement is stopped and optical recognition system 9 will verify whether a seed with the desired dimensions and/or position lies on vibrating plate 6 and whether this seed is sufficiently far removed from the closest other seed. Optical recognition system 9 comprises for this purpose an image analysis unit which makes use of per se known image processing techniques for comparing a detected contour and one or more reference contours.

If it is determined that a desired seed is present on vibrating plate 6 at sufficient distance from other seeds, optical recognition system 9 will provide for output of position information to the control unit and/or robot arm device 4 so that this latter can pick up the seed. Robot arm device 4 is provided for this purpose with a suction nozzle 13 which is connected to coupling part 8. Suction nozzle 13 is formed by one or more small openings 14 at the end of an air duct in a body. This duct is connected via a conduit 31 to an air system. This air system preferably comprises a vacuum pump for evacuating the duct in order to thus suck up a seed. Opting for openings which are not too large can prevent the seed getting into the duct.

After robot arm device 4 has picked up the seed, robot arm device 4 moves coupling part 8 to a falling tube 15 which corresponds to a sowing position for the seed. Falling tube 15 is shown in more detail in FIG. 2. The lower ends of falling tubes 15 are mutually connected by a coupling element 16. This is also arranged on the upper side, where upper openings 18 of falling tubes 15 are mutually connected by a coupling element 17. Robot arm device 4 will pick up a seed from vibrating plate 6 during operation using suction nozzle 13 and drop it in one of the openings 18.

FIGS. 1 and 2 clearly show that the outer ends of falling tubes 15 are disposed in one line. This makes it possible to sow in a growth substrate comprising a plurality of sowing positions, such as a tray. A tray comprises for instance a row of 20 sowing positions in a direction transversely of the direction of movement of the tray, which direction of movement is indicated by arrow 17 in FIG. 1, and 30 or more rows in the direction of movement. The sowing positions are preferably placed in a regular pattern, such as in a chessboard pattern.

For the sake of simplicity the tray is not shown in FIGS. 1 and 2. It suffices here to indicate that the system comprises a tray guiding system which can move the tray in the direction indicated by arrow 17 in stepwise manner. It is the intention here that during sowing one row of sowing positions is each time aligned relative to the outer ends of falling tubes 15.

When robot arm device 4 has carried a seed to a falling tube 15 the seed can be released. This can be achieved in that the air system vents the duct of suction nozzle 13 or provides it with compressed air via conduit 31. The seed will hereby fall through falling tube 15 and into the sowing position in the growth substrate disposed under the outer end of falling tube 15.

Optical recognition system 9 will then determine whether there is another seed which can be picked up. If this is not the case, vibrating plate 6 can be controlled to perform another vibrating movement. The subsequent seed is placed in the subsequent sowing position of the same row, optionally taking into account the skipping of sowing positions if this is prescribed by the sowing program.

The above method is repeated until all sowing positions in a row have been completed. The tray is then shifted one position in the direction of movement so that a new row is positioned under falling tubes 15. Placing of seeds is then resumed until no more seeds are present on vibrating plate 6 or until no more seeds can be sufficiently separated, for instance because seeds have clumped together, or until there are no more seeds corresponding to the sowing profile, or until the desired number of seeds has been sown.

It is possible for the sowing program to indicate that 100 seeds have to be sown, while there were only 50 in a tube 3. In such a case the rest of the seeds will have to be taken out of another tube 3 from cartridge 2. An error message can be generated if such a tube is not present.

Robot arm device 4 comprises an error correction mechanism for picking up and dropping the seeds. An error can be detected in that optical recognition system 9 detects insufficient difference between an image of vibrating plate 6 with the seeds present thereon before and after a seed is picked up. The error can have different causes. A first possibility is that the seed was simply not picked up because of suction nozzle 13 did not come close enough. This can be solved by having robot arm device 4 move toward the same seed, but wherein suction nozzle 13 is moved closer to vibrating plate 6.

Another cause of error is that a seed is stuck in opening 14. Robot arm device 4 hereby cannot sow the seed and cannot pick up a subsequent seed. In an embodiment robot arm device 4 is provided with a pin movable in the duct. By moving this pin downward and optionally inserting it through opening 14, the stuck seed can be pushed away. The pin can be embodied here as part of or the pin can be connected to a piston rod of an air cylinder which is actuated with compressed air via conduit 32. By supplying compressed air to this conduit, the pin will move downward and preferably protrude from opening 14 so that any fouling, such as a stuck seed, is removed. It is possible for the piston rod or pin to be under spring tension, so that the pin automatically shoots back when the compressed air drops out.

It is also possible to determine whether a seed is stuck by means of pressure measurements in the duct. This is because the pressure in the duct should decrease after the intended falling of the seed. If this is not the case, there is a great chance that a seed is stuck.

The above stated correction mechanisms can be combined. If image comparison for instance indicates that the difference between images of before and after a seed has been picked up is too small, the pin can be moved and the same seed can be picked up once again with a different depth setting of robot arm device 4.

After the desired number of seeds with a determined taxonomy has been placed, the system will continue by sowing seeds with the subsequent taxonomy. The above described method is employed here, wherein it is noted that the subsequent seeds generally come from a different tube. These seeds are optionally placed in a different row than the previous seeds. It is however not impossible for the seeds to be placed in the same row, once again preferably taking into account the desired mutual distance between the seeds.

When all tubes 4 from a cartridge 2 have been processed, supply device 1 can guide a subsequent cartridge 2 into position, for instance by pushing. The system will continue sowing in accordance with the sowing program. It is thus possible to use seeds coming from a plurality of tubes 3 from a plurality of cartridges 2 within one sowing program. A sowing program can also comprise information regarding which seeds with differing taxonomy can be combined on the same growth substrate.

The system can comprise a device which adds determined nutrients, water or biologically active substances, such as pesticides, to the sown seeds. This device is preferably placed downstream of the sowing. Within the context of the present invention it is possible for the control unit to control such a device such that the addition of substances takes place specifically for each seed, for each tray or for each different taxonomy.

The method stops after all seeds stated in the sowing program have been sown. The system can comprise a tray guiding system (not shown) in which a plurality of trays can be stored and can be brought into alignment with falling tubes 15 one by one. In an embodiment the trays are placed joined together on a guide, whereby a substantially elongate growth substrate is created. An identifier application unit preferably arranges a different identifier in each tray. This enables the system to track which tray is provided with which seeds.

The growth substrates can comprise a storage medium such as an RFID chip with memory. Information regarding the seeds sown on the growth substrate can be stored on this storage medium by the system. Information about the substances which may have been added before, during or after sowing can also be stored in this memory.

It will be apparent to the skilled person that different modifications can be made in the above-described embodiment without departing from the scope of protection defined by the following claims.

The invention claimed is:

1. A system for sowing a plurality of seeds, comprising:
   a separating device for separating a single seed relative to a remainder of the plurality of seeds;

an optical recognition system for recognizing the separated seed;
a robot arm device for picking up the separated seed and for sowing the picked-up seed; a control unit for controlling the separating device, the optical recognition system and the robot arm device; and
a memory configured to store a seed profile, wherein the seed profile describes characteristics regarding the dimensions and/or shape of the seed for separating,
wherein the seeds are sown on a growth substrate with a plurality of sowing positions;
the system further comprising:
a substrate moving unit for moving the growth substrate in stepwise manner, wherein the growth substrate comprises a row of sowing positions transversely of a direction of movement of the growth substrate, wherein the control unit is configured to control the robot arm device to sow one seed at a time in one sowing position of a row and, when the sowing in the row has been completed, to control the substrate moving unit to bring a subsequent row of sowing positions into position; and
a plurality of falling tubes which are disposed such that each lower opening of each falling tube can be aligned during operation with a respective sowing position associated with the same row,
wherein the optical recognition system comprises: a camera for recording an image of the plurality of seeds; an image analysis unit for analysing the recorded image, wherein the image analysis unit is configured to identify the separated seed on the basis of the seed profile; an output unit for output of position information about the identified seed to the robot arm device,
wherein the image analysis unit is configured to detect a contour in the recorded image and to assign the contour to a seed if dimensions and/or shape of the detected contour correspond to the seed profile,
wherein the control unit is configured to control the separating device to once again separate the seeds if the optical recognition system has detected at least one contour, but wherein no seed has been recognized on the basis of the seed profile.

2. The system of claim 1, wherein all seeds of the stated plurality of seeds have the same taxonomy, and all seeds of the stated plurality belong to the same plant family, genus, species, subspecies, variety, progeny of a crossing or groups of crossings, or the same population.

3. The system of claim 1, wherein the system is configured only to pick up the detected seed if the distance between the detected contour and an adjacent contour is more than a predetermined distance.

4. The system of claim 1, wherein the separating device comprises a vibrating plate.

5. The system of claim 1, wherein the robot arm device comprises a robot arm which is provided at an end with a suction nozzle.

6. The system of claim 1, wherein the system is configured to compare a recorded image of after and before the robot arm device picks up the separated seed, wherein the control unit is configured to control the robot arm device once again to pick up the separated seed if there is insufficient difference between the compared images.

7. The system of claim 6, wherein a depth setting corresponding to a distance to a base on which the separated seed lies is adjusted for said repeated picking up of the separated seed.

8. The system of claim 1, further comprising a supply device for supplying the seeds in a container.

9. The system of claim 8, wherein the control unit is configured to control the robot arm device to engage the container and to carry the seeds out of the container and to the separating device.

10. The system of claim 9, wherein the robot arm device comprises a first device for picking up the separated seed and a second device for engaging the container.

11. The system of claim 9, wherein the sowing program further comprises the number of seeds to be sown per taxonomy and wherein, if this number has been sown and seeds still remain, the control unit is configured to control the separating device to discharge the remaining seeds.

12. The system of claim 9, wherein the control unit is configured to track the sowing positions at which a seed with a determined taxonomy has been sown and/or wherein the sowing program comprises information about the sowing positions at which a seed with a determined taxonomy has to be sown.

13. The system of claim 12, wherein the control unit is configured to add information about the sowing positions at which a seed with a determined taxonomy has been sown to the sowing program.

14. The system of claim 9, further comprising a device for supplying to the sown seeds one or more substances chosen from the group consisting of water, germination-promoting agents, growth-promoting agents and pesticides.

15. The system of claim 14, wherein the sowing program comprises substance information per seed or per taxonomy regarding which of said substances must be supplied, and wherein the control unit is configured to control the device for supplying these substances subject to the substance information.

16. The system of claim 1, wherein the memory is configured to store a sowing program comprising a correlation between information regarding the taxonomy of the seeds and a sowing pattern for said sowing.

17. The system of claim 16, wherein the sowing program comprises the correlation between information regarding the taxonomy of the seeds and a sowing pattern for said sowing.

18. The system of claim 1, wherein the growth substrate is provided with an identifier.

19. The system of claim 18, further comprising an identifier application unit for arranging the identifier on the growth substrate.

20. The system of claim 18, wherein the growth substrate comprises a storage medium, wherein the control unit is configured to store information regarding the sowing positions at which a seed with a determined taxonomy has been sown in the storage medium.

21. The system of claim 1, wherein the growth substrate is a tray.

22. A method for sowing seeds, comprising:
storing a seed profile, wherein the seed profile describes characteristics regarding the dimensions and/or shape of the seed for separating;
separating a single seed relative to a remainder of the plurality of seeds using the separating device;
optically recognizing the separated seed with an optical recognition system;
picking up the separated seed with the robot arm device and sowing the picked-up seed with the robot arm device;
moving a growth substrate in stepwise manner, wherein the growth substrate comprises a row of sowing positions transversely of a direction of movement of the growth substrate; and controlling the robot arm device to sow one seed at a time in one sowing position of a row and, when the sowing in the row has been completed, to bring a subsequent row of sowing positions into position;

wherein during sowing of the picked-up seed the robot arm device drops this seed through one of a plurality of falling tubes, wherein the falling tubes are disposed such that each lower opening of each falling tube can be aligned during operation with a respective sowing position associated with the same row, wherein the optical recognition system comprises: a camera for recording an image of the plurality of seeds; an image analysis unit for analysing the recorded image, wherein the image analysis unit is configured to identify the separated seed on the basis of the seed profile; an output unit for output of position information about the identified seed to the robot arm device, wherein the image analysis unit is configured to detect a contour in the recorded image and to assign the contour to a seed if dimensions and/or shape of the detected contour correspond to the seed profile, wherein the separating device is controlled to once again separate the seeds if the optical recognition system has detected at least one contour, but wherein no seed has been recognized on the basis of the seed profile.

\* \* \* \* \*